J. SEFRANEK.
TANDEM ATTACHMENT FOR TRICYCLES.
APPLICATION FILED JUNE 22, 1918.

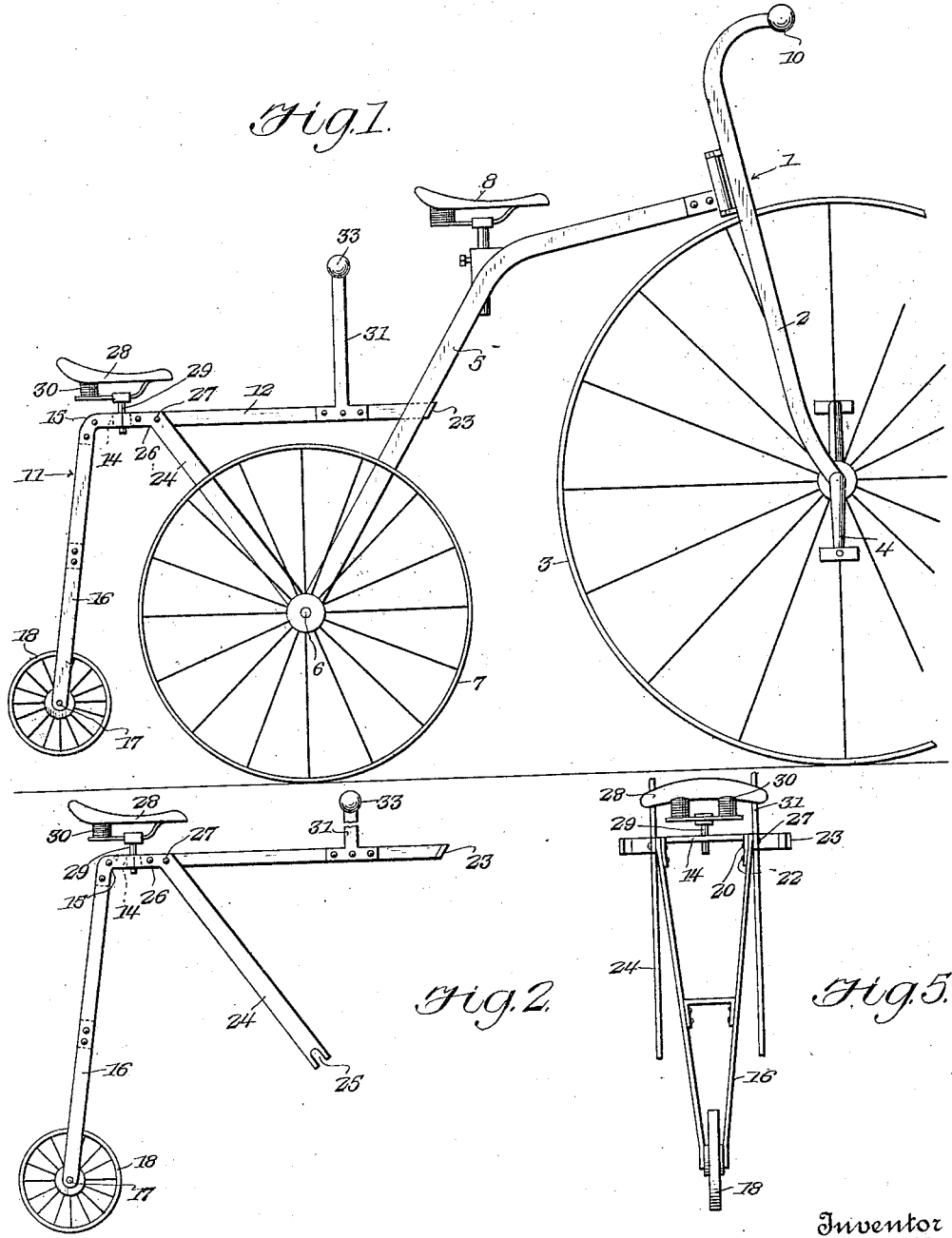

1,295,804.

Patented Feb. 25, 1919.
2 SHEETS—SHEET 2.

Inventor
John Sefranek,
By Victor J. Evans
Attorney

Witnesses

UNITED STATES PATENT OFFICE.

JOHN SEFRANEK, OF SOUTH BETHLEHEM, PENNSYLVANIA.

TANDEM ATTACHMENT FOR TRICYCLES.

1,295,804.  Specification of Letters Patent.  Patented Feb. 25, 1919.

Application filed June 22, 1918. Serial No. 241,334.

*To all whom it may concern:*

Be it known that I, JOHN SEFRANEK, a citizen of the United States, residing at South Bethlehem, in the county of Northampton and State of Pennsylvania, have invented new and useful Improvements in Tandam Attachments for Tricycles, of which the following is a specification.

This invention is an improved tandem attachment for tricycles, the object of the invention being to provide a tandem attachment which may be readily arranged on the rear end of a tricycle and is provided with a seat so that the tricycle can be adapted to accommodate two riders, tandem, another object of the invention being to provide an improved device of this character which is extremely simple in construction which can be readily attached to and detached from a tricycle, without the use of tools and which also serves to prevent the tricycle from tilting over backward.

With the above and other objects in view, the invention consists in the construction, combination and arrangement of devices hereinafter described and claimed.

In the accompanying drawings:—

Figure 1 is an elevation of a tricycle of usual form and showing a tandem attachment constructed and arranged in accordance with my invention and attached to the tricycle.

Fig. 2 is a detail side elevation of the tandem attachment.

Fig. 5 is a detail rear elevation of the same.

Figure 3:
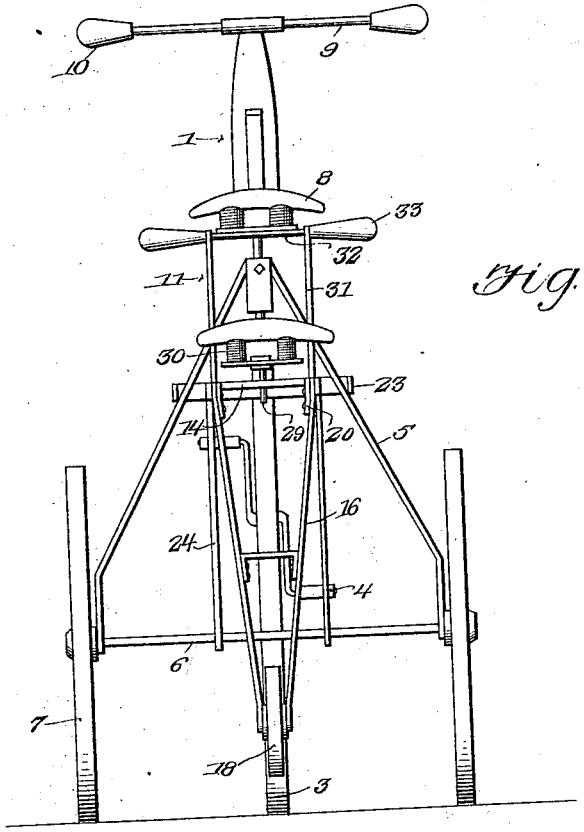
Fig. 3 is a rear elevation of the tricycle and tandem attachment.
Figure 4:
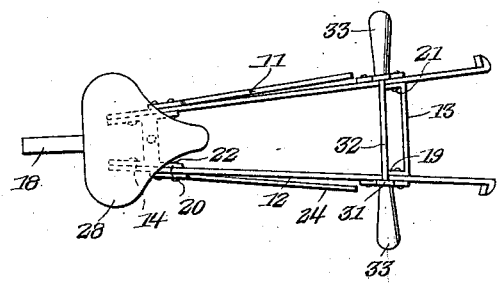
Fig. 4 is a detail plan of the tandem attachment.

The tricycle 1, which is here shown, is of the usual construction used by children and comprises the front fork 2, the front wheel 3, the pedals 4, a rearwardly extending fork frame 5, the rear axle 6 and the rear wheels 7. The usual seat is indicated at 8 and the steering bar is indicated at 9, provided with the handles 10.

In accordance with my invention, I provide a tandem attachment 11 which may be attached to the rear end of the tricycle to accommodate a second rider. The tandem attachment comprises a pair of rearwardly converging side bars 12 which have a front connecting bar 13 arranged between them at a point a suitable distance from their front ends and also have a rear connecting bar 14 arranged between them at a point a suitable distance in rear of the front connecting bar. The bars 12 are bent as at 15 and formed with downwardly extending and downwardly converging arms or standards 16 which are provided near their lower ends with openings for the reception of the short axle 17 of a rear fender wheel 18. The said fender wheel is normally raised above and out of contact with the ground, as shown in Fig. 1. The cross bars 13, 14 are respectively provided at their ends with angle heads 19, 20 which are bolted or riveted to the bars 12 as at 21, 22. The front ends of the bars 12 are adapted to be arranged between the arms of the fork frame 5 of the tricycle and are provided at their front ends and on their outer sides with outturned shoulder hooks 23 which engage the front edges of the fork arms 5. A pair of downwardly and forwardly extending brace and supporting bars 24 are provided with open slots 25 at their lower ends to engage and receive the rear axle of the tricycle and the upper ends of said brace and supporting bars are turned rearwardly as at 26 and secured to the frame bars 12 of the tandem attachment by means of bolts or rivets 27. The rear seat 28, of the tandem attachment, is supported by a standard 29 which is vertically movable in an opening in the cross bar 14, cushioning springs 30 being also provided which bear on said cross bar and under said rear seat.

Standards 31 are secured to the bars 12 at points opposite the ends of the front cross bar 13 and the said standards are connected by a handle bar 32 which passes through openings near the upper ends of said standards and is provided at its ends with handles 33 to be grasped by the rider on the rear seat.

It will be understood that in order to detach the tandem attachment from the tricycle it is only necessary to first raise the rear end of the attachment in order to disengage the slotted lower ends of the brace and supporting bars 24 from the rear axle of the tricycle and the shoulder hooks 23 of the frame of the attachment can be then readily disengaged from the rear fork frame of the tricycle.

The fender wheel 18 prevents the tricycle from tilting over rearwardly when the child on the front seat gets off while the child on the rear seat remains thereon.

It will be understood that the attachment when connected to the tricycle cannot slip or become displaced when in use and that the attachment is extremely strong and durable and can be readily manufactured at small cost. The use of the attachment enables a tricycle to be used by two children, thus greatly increasing the value of the tricycle and affording increased pleasure to the users thereof.

While I have herein shown and described a preferred embodiment of my invention, I would have it understood that changes and construction of the several parts, without departing from the spirit of my invention, and within the scope of the appended claims.

Having thus described my invention, what I claim as new is:

1. A tandem attachment for tricycles comprising a frame having means at its front end to engage the rear fork of a tricycle and also provided with supporting bars to connect with the rear axle of the tricycle, said frame being provided with a rear seat, and being also provided with a handle bar and with supporting means for the handle bar, the said attachment frame also having downwardly extending arms at its rear end and a fender wheel carrier at the lower ends of said arms.

2. A tandem attachment for tricycles comprising a frame having rearwardly converging side members provided at their front ends with outwardly extending shoulder hooks to engage the front edges of the rear fork frame of a tricycle, a seat on said frame of the attachment and forwardly and downwardly extending brace and supporting bars secured to said attachment frame and provided at their lower ends with slots to receive the rear axle of a tricycle, the said attachment frame also having downwardly extending arms at its rear end and a fender wheel carried at the lower ends of said arms.

In testimony whereof I affix my signature.

JOHN SEFRANEK.

Copies of this patent may be obtained for five cents each, by addressing the "Commissioner of Patents, Washington, D. C."